United States Patent
Cohen et al.

(10) Patent No.: US 7,155,620 B2
(45) Date of Patent: Dec. 26, 2006

(54) POWER CONDITIONING MECHANISM USING AN EXTERNAL CARD ADAPTER

(75) Inventors: Yossi Cohen, Laguna Niguel, CA (US); Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 397 days.

(21) Appl. No.: 10/679,095

(22) Filed: Oct. 3, 2003

(65) Prior Publication Data

US 2005/0066071 A1 Mar. 24, 2005

Related U.S. Application Data

(60) Provisional application No. 60/505,881, filed on Sep. 24, 2003.

(51) Int. Cl.
*G06F 1/26* (2006.01)

(52) U.S. Cl. ............... 713/320; 713/300; 713/310

(58) Field of Classification Search ........... 713/300, 713/320, 330, 310
See application file for complete search history.

(56) References Cited

U.S. PATENT DOCUMENTS

| | | | |
|---|---|---|---|
| 5,491,830 A * | 2/1996 | Ferri | 710/9 |
| 6,329,856 B1 * | 12/2001 | Tabler et al. | 327/170 |
| 6,882,543 B1 * | 4/2005 | Kenny et al. | 361/764 |
| 6,931,554 B1 * | 8/2005 | Kung | 713/320 |
| 2002/0178307 A1 * | 11/2002 | Pua et al. | 710/62 |
| 2003/0065867 A1 * | 4/2003 | Mowery et al. | 710/310 |
| 2003/0072424 A1 * | 4/2003 | Evans et al. | 379/106.02 |
| 2003/0074514 A1 * | 4/2003 | Minami et al. | 710/307 |
| 2003/0149901 A1 * | 8/2003 | Huang | 713/300 |
| 2003/0172123 A1 * | 9/2003 | Polan et al. | 709/213 |
| 2004/0103223 A1 * | 5/2004 | Gabehart et al. | 710/2 |
| 2004/0192114 A1 * | 9/2004 | Liou | 439/630 |
| 2004/0205273 A1 * | 10/2004 | Mowery et al. | 710/301 |
| 2005/0059281 A1 * | 3/2005 | Bricaud et al. | 439/188 |

* cited by examiner

*Primary Examiner*—Thomas Lee
*Assistant Examiner*—Malcolm Cribbs
(74) *Attorney, Agent, or Firm*—McAndrews, Held & Malloy, Ltd.

(57) ABSTRACT

One or more methods and systems of providing a conditioned power source to an external card that is communicatively connected to a host computing device by way of an external card adaptor are presented. The system and method facilitates the use of an external card having a connector that is incompatible with a PC card connector provided by the host computing device. In one or more embodiments, the external card adaptor performs power conditioning and/or voltage conversions of one or more power signal inputs provided by the host computing device. The power conditioning is performed using a power conditioning circuitry while the voltage conversions are performed using a voltage conversion circuitry.

22 Claims, 2 Drawing Sheets

POWER CONDITIONING MECHANISM USING AN EXTERNAL CARD ADAPTER

RELATED APPLICATIONS/INCORPORATION BY REFERENCE

This application makes reference to and claims priority from U.S. Provisional Patent Application Ser. No. 60/505,881, entitled "POWER CONDITIONING MECHANISM USING AN EXTERNAL CARD ADAPTER", filed on Sep. 24, 2003, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The application of technology has lead to significant improvements in the area of portable computing devices. Additional functions and features may be realized through the addition of external cards that may be easily inserted into a slot within the portable computing device. For example, these external cards may comprise a PCMCIA card such as an 802.11b adapter allowing one to wirelessly surf the internet using his laptop. In another example, a compact flash (CF/CF+) card may be used to enhance or improve the capabilities of one's PDA.

A variety of external card form factors have been developed for mating with their corresponding portable computing devices. As a result, a particular external card may be suitable for insertion in one portable computing device but unsuitable for insertion in another portable computing device. A user will often resort to purchasing additional external cards to provide the same functional capabilities for each portable computing device he uses. As a consequence, the number of external cards a user may have to manage may be quite large, causing an inconvenience to the user. Furthermore, the cost of purchasing additional cards that perform the same function is certainly unappealing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a system and method to effectively provide power to an external add-on card that is connected to a host computer by way of an external adaptor.

In one embodiment, a method involves providing conditioned power signals from an external card adaptor to an external card by receiving one or more power signal inputs from a host computing device, by conditioning the one or more power signals inputs using a power conditioning circuitry to generate the conditioned power signals, and by transmitting the conditioned power signals to the external card adaptor. In one embodiment, the method includes a voltage conversion of the one or more power signal inputs. The process of voltage conversion up-converts one or more voltages of the one or more power signals inputs to increase power stored within the external card adaptor. In one embodiment, the voltage conversion circuitry up-converts or down-converts the one or more voltages of the one or more power signal inputs in order to deliver appropriate voltage levels to the external card. In one embodiment, the power conditioning circuitry includes one or more capacitors having a size that permits it to be used as a charge reservoir. In another embodiment, the power conditioning circuitry utilizes one or more bypass capacitors. In one embodiment, the external card connected to the external card adaptor is a compact flash (CF/CF+) card.

In one embodiment, a system for providing conditioned power signals from an external card adaptor to an external card includes a first connector for connecting the external card adaptor to the external card, a second connector for connecting the external card adaptor to a host computing device, a printed circuit board, and an adaptor frame used for receiving the external card and securing the first connector, the second connector, and the printer circuit board. In one embodiment, the printed circuit board is characterized by a mapping circuitry that appropriately maps corresponding signals between the external card and the host computing device.

In one embodiment, a power conditioning circuitry is used to condition one or more power supply signal provided by the host computing device.

In another embodiment, a voltage conversion circuitry used to generate increased charge within the external card adaptor.

The power conditioning circuitry may contain one or more large capacitors that act as charge reservoirs or one or more passive components used to filter out noise in the one or more power supply signals provided by the host computing device.

In one embodiment, the printed circuit board includes a voltage level sensor that monitors the power supply voltages delivered to the external card. In one embodiment, the printed circuit board incorporates a voltage level sensor that monitors the power supply voltages delivered to the external card. The voltage level sensor is capable of sensing an inadequacy of power delivered to the external card so as to effectuate a certain voltage level for a control signal that is used to enable the power conditioning circuitry or the voltage conversion circuitry.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to effectively provide conditioned power to an external add-on card that is communicatively connected to a host computer by way of an external adaptor. The external adaptor comprises power conditioning circuitry and optional voltage conversion circuitry that facilitates the generation of an improved power source to the external card. The external adaptor establishes a secure physical connection of the external card to the host computer, facilitates communication of the external card to the host computer, and provides a power source that meets or exceeds the operating power requirements of the external card. The system and method facilitates the use of an external card having a connector that is incompatible with the PC card connector provided by the host computing device. For example, aspects of the present invention may allow a portable laptop computer having a PCMCIA connector (a specific type of PC card connector), to connect to and adequately power a compact flash (CF/CF+) card. Typically, a user uses the compact flash (CF/CF+) card with an exemplary handheld device such as a pocket PC or PDA. The user inserts the compact flash card into the handheld device to increase available memory. The external adaptor may facilitate connection of the exemplary laptop to an external card such as a Compact flash (CF/CF+) card, secure digital (SD) memory card, PCMCIA card, wireless 802.11b card, modem card, or any other type of card which may be incompatible to the PC card connector provided by the host computing device. Aspects of the present invention allow a previously incompatible external card to seamlessly connect to a host computing device, and to properly function by way of using the external adaptor. Aspects of the present invention obviate performance issues that may be related to insufficient power supplied to an external card due to current limitations posed by host computing device's external card or PC card connector.

Figure 1:
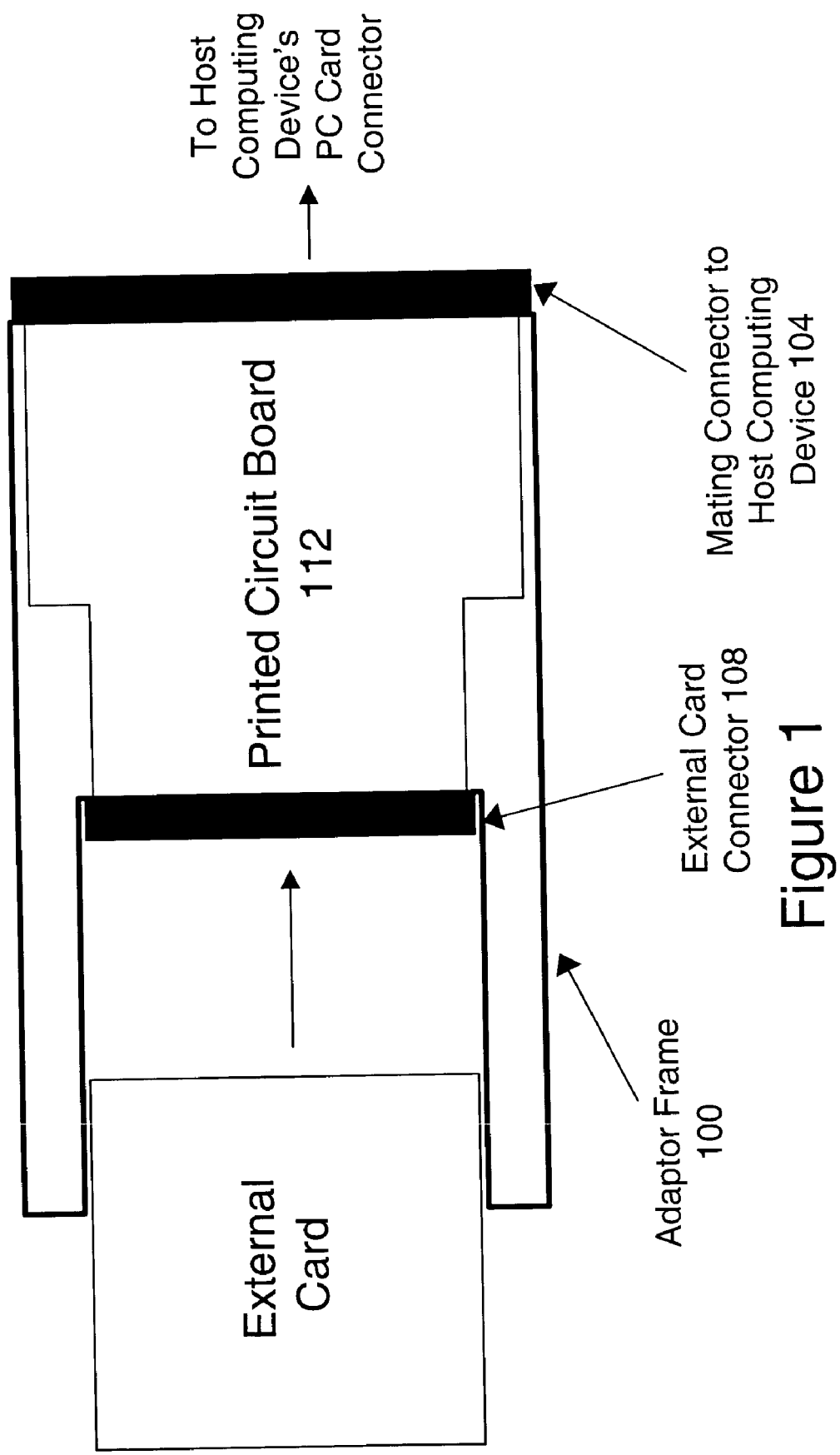
FIG. 1 is a relational block diagram of a system comprising an external card adapter in accordance with an embodiment of the invention.

FIG. 1 is a relational block diagram of a system comprising an external card adapter in accordance with an embodiment of the invention. The external card adapter comprises an adaptor frame 100, a mating connector to host computing device 104, an external card connector 108, and a printed circuit board (PCB) 112. As shown, an external card (which is not part of the system) is partially inserted into the external card adapter, in order to illustrate the external card adapter's mechanism of operation. The adaptor frame 100 may comprise a material such as a plastic, that is compatible with any environmental condition generated by a host computing device. The adapter frame 100 firmly houses or secures the PCB 112, the mating connector to host computing device 104, and the external card connector 108 together. At one end, the external card adapter connects to the host computing device's external card connector by way of its mating connector to host computing device 104. At the other end, an external card may be inserted into a recess of the adaptor frame 100, as shown in FIG. 1, and connected to the external card by way of the external card connector 108. The external card connector 108 may comprise one of many connectors configured for mating with one or more types of external cards. In one embodiment, one or more connecting pins residing within the external card connector 108 may be reconfigured to mate with the one or more types of external cards. The one or more types of external cards may be characterized by different form factors and pin layouts. The host computing device mating connector 104 and the external card connector 108 may comprise a number of conductive connecting pins seated within their respective connectors. The host computing device mating connector 104 may comprise any type of mating connector compatible to the connector provided by the host computing device. The printed circuit board 112 may comprise a mapping circuitry that connects corresponding signals between the external card and the host computing device. For example, in one embodiment, the circuitry may comprise electrically conductive traces on a PCB that maps corresponding pins of the two connectors 104, 108. Further, the printed circuit board 112 comprises a power conditioning circuitry used to condition one or more power signals provided by the host computing device. The power signals may be characterized as voltages that are capable of supplying a specified amount of current. The power conditioning provided by the power conditioning circuitry generates conditioned power signals to the external card that will satisfy its power requirements. The power conditioning circuitry may, for example, provide the external card with a power source that exceeds the external card's instantaneous power requirements. In one embodiment, the power conditioning circuitry may be selectively enabled by way of a switch positioned on the external card adapter. In one embodiment, the printed circuit board 112 may intelligently sense that the power delivered to the external card is insufficient for normal operation. As a consequence, electrical components within the printed circuit board 112 may enable or activate the power conditioning circuitry. The printed circuit board 112 may comprise electrical components capable of sensing an inadequacy of power delivered to the external card, thereby effectuating a particular voltage in a control signal that may enable the power conditioning circuitry. In one embodiment, the external card adaptor may be configured to generate an indication, such as by way of illuminating an LED, when the power conditioning circuitry is enabled. In general, the power conditioning circuitry comprises any intelligent circuitry capable of effectuating the delivery of conditioned power signals to the external card by the host computing device, by way of the host computing device mating connector 104. The power conditioning circuitry may comprise any number of electrical components configured in a way to effectively clean, stabilize, or filter the power signals delivered to the external card. In one embodiment, the power conditioning circuitry may comprise passive components such as capacitors and/or resistors. The power conditioning circuitry may employ bypass capacitors or other low pass filters in order to provide an improved direct current power source to the external card. In one embodiment, the printed circuit board 112 may contain a voltage conversion circuitry. The voltage conversion circuitry may optionally up-convert and/or down-convert voltages in order to supply the appropriate levels of power supply voltages to an external card. In addition, the voltage conversion circuitry may optionally up-convert voltage levels within the external card adaptor in order to facilitate storage of maximum power within the external card adaptor. The voltage conversion circuitry may facilitate a voltage up-conversion of the power supply voltages received by the mating connector to host computing device 104. As a consequence, one or more capacitors located within the power conditioning circuitry may store increased charge. The increased charge will be used to power the external card that is attached to the external card adaptor. In one embodiment, the voltage conversion circuitry may be used to facilitate the transfer of power from the external card adaptor to the external card by way of the external card connector 108. As a result of these techniques, an adequate amount of power is capable of being delivered to the external card. Additional details regarding the power conditioning circuitry and voltage converter will be discussed in relation to FIG. 2.

Figure 2:
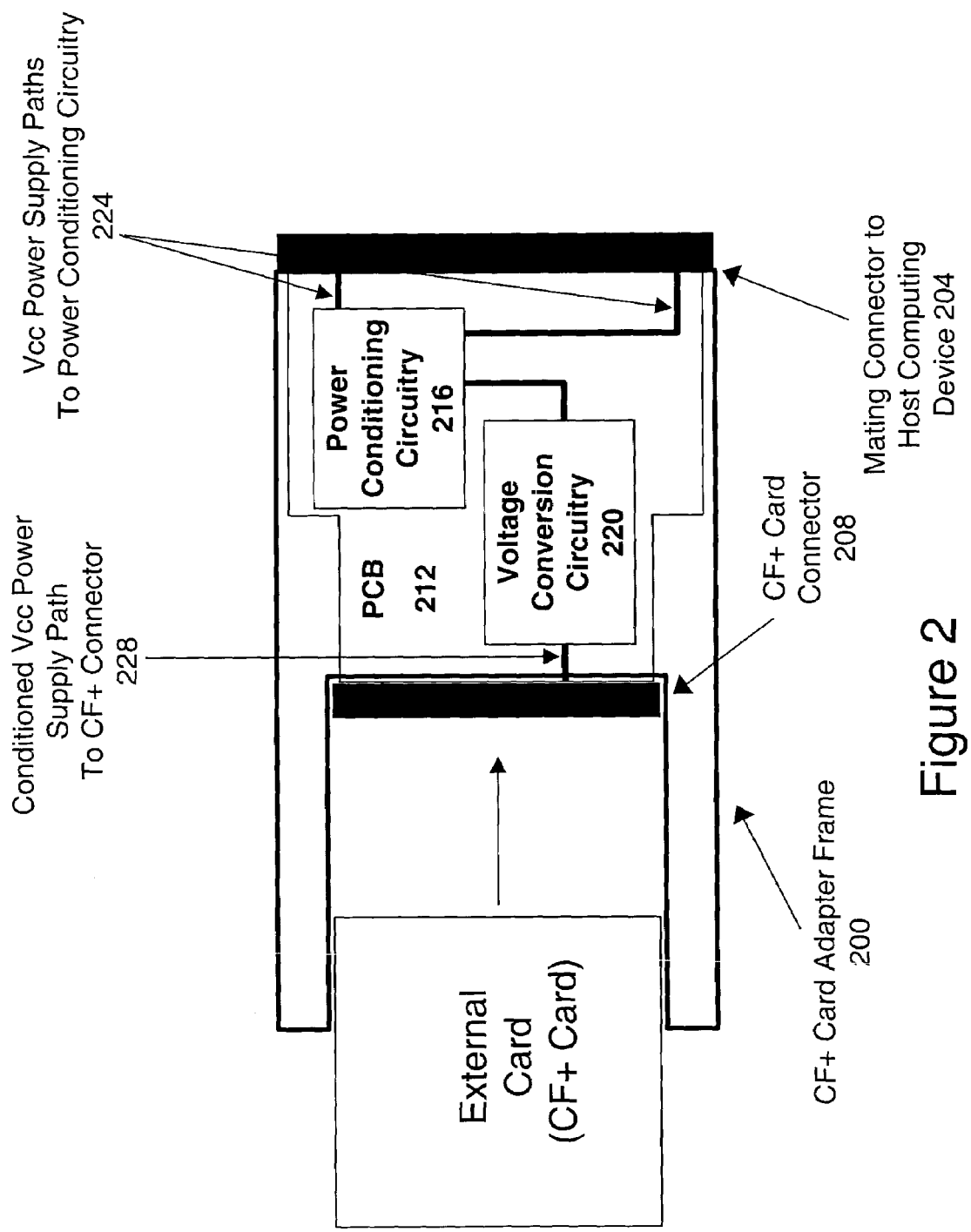
FIG. 2 is a detailed relational block diagram of an exemplary CF+ card adaptor in accordance with an embodiment of the invention.

FIG. 2 is a detailed relational block diagram of an exemplary CF+ card adaptor in accordance with an embodiment of the invention. In reference to this embodiment, the external card that connects to the CF+ card adaptor comprises an exemplary CF+ card while the host computer provides a PCMCIA connector. In the embodiment shown in FIG. 2, the CF+ card adaptor comprises a CF+ card adaptor frame 200, a mating connector to host computing device 204 (i.e. a mating connector to the host computing device's PCMCIA card connector), a CF+ connector 208, a printed circuit board (PCB) 212, a power conditioning circuitry 216, and a voltage conversion circuitry 220. The power conditioning circuitry 216 and the voltage conversion circuitry 220 may be implemented on the printed circuit board (PCB) 212. As described in FIG. 1, the PCB 212 may intelligently sense that the power delivered to the CF+ card is insufficient for proper operation. As a consequence, electrical components within the printed circuit board 212 may enable or activate the power conditioning circuitry. The printed circuit board 212 may comprise electrical components capable of sensing an inadequacy of power delivered to the external card, thereby effectuating a certain voltage level (such as a digital 0 or 1) of a control signal that may be used to enable the power conditioning circuitry. As described in FIG. 2, the CF+ card adapter may comprise a mapping circuitry that appropriately maps corresponding signals between the CF+ card and die host computing device. In one embodiment, the circuitry may comprise electrically conductive traces on a PCB that maps corresponding signals between the two connectors 204, 208. As shown in FIG. 2, the exemplary CF+ card slides into a suitable recess provided by the CF+ card adapter frame 200, guiding the CF+ card into the CF+ card connector 208. Also shown are one or more conductive Vcc power supply paths 224 originating from the mating connector to host computing device 204 and terminating at the power conditioning circuitry 216. These Vcc power supply paths 224 receive power provided by the host computing device. In addition, a conditioned Vcc power supply path 228 distributes conditioned power from the voltage conversion circuitry 220 to the CF+ connector. The conditioned Vcc power supply pat 228 may provide power signals that have been processed by the power conditioning circuitry 216 and the voltage conversion circuitry 220. As shown, the Vcc power may be distributed from the power conditioning circuitry 216 to the voltage conversion circuitry 220. For example, the Vcc power delivered from the host through the mating connector 204 may supply the voltage conversion circuitry 220 by way of the power conditioning circuitry 216. in one embodiment, the voltage conversion circuitry 220 effects a voltage conversion of the voltage supplied to the power conditioning circuitry 216 by way of one or more conductive paths provided by the power conditioning circuitry 216 to the voltage conversion circuitry 220. In one embodiment, the voltage conversion comprises a voltage up-conversion to facilitate an increased charge to be stored in one or more capacitors located within the power conditioning circuitry 216. The voltage conversion circuitry 220 may up-convert and/or down-convert voltages, as required, in order to maximize the power stored within the PCB 212. As a result, an adequate amount of power reserve is stored within the CF+ card adaptor for eventual delivery to the CF+ card. In one embodiment, to power conditioning circuitry 216 and the voltage conversion circuitry 220 may be selectively enabled by way or intelligent circuitry residing on the PCB 212. The intelligent circuitry may comprise a voltage level sensor that monitors the power supply voltages delivered to the exemplary CF+ card. For example, the voltage level sensor may trigger use of either the power conditioning circuitry 216 or the voltage conversion circuitry 220 when a power supply voltage delivered to the CF+ card reaches an undesirable level. In another embodiment, a mechanically or electrically controlled switch enables the voltage conversion circuitry 220. In one embodiment, one or more indicators may be used to indicate when the power conditioning circuit 216 and/or voltage conversion circuitry 220 are enabled. The one or more indicators may comprise LEDs located in the CF+ card adapter, a software generated indicator that is displayed by way of a monitor at the host computing device, or any other electrically induced indicator. When applied, the voltage conversion circuitry 220 up-converts or down-converts the voltages of power signals within the CF+ card adapter in order to maximize the power stored within the CF+ card adaptor. For example, the voltage conversion circuit 220 may up-convert the voltages of the power signals in order to capture more power from the host computing device given a maximum current limitation of the connector of the host computing device. Prior to transmitting the power signals to the CF+ card, the voltage conversion circuitry 220 may down-convert the voltage to levels required by the CF+ card.

The power conditioning circuitry 216 may comprise any number of electrical components configured in a way to effectively clean, stabilize, or filter the power signals delivered to the exemplary CF+ card. In one embodiment, the power conditioning circuitry 216 may comprise passive components such as capacitors and/or resistors. In one embodiment, the power conditioning circuitry 216 may comprise one or more "super" capacitors that act as reservoirs of charge. These large capacitors provide a stable source of power to the CF+ card during transient or instantaneous power surge occurrences. In one embodiment, bypass capacitors may be used at various points along the PCB 212 to filter out noise that may be present in the power supply signals provided by the host computing device.

Although the embodiment of FIG. 2 describes a CF+ card adapter, it is contemplated that in additional embodiments, other types of external cards may be adapted for use by the present invention. It is contemplated that the circuitry residing on the PCB may be appropriately configured for use with external cards of different form factors and power requirements. In summary, the signal conduction paths and electrical components of the printed circuit board (PCB), the power conditioning circuitry, and voltage conversion circuitry, as previously described in the preceding embodiments may be configured to satisfy the operational requirements of the external card used.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of providing conditioned power signals from an external card adaptor to an external card comprising:
   receiving one or more power signal inputs from a host computing device;
   conditioning said one or more power signal inputs to generate said conditioned power signals, said conditioning performed by said external card adaptor; and
   transmitting said conditioned power signals to said external card, said external card connected to said host computing device by way of said external card adaptor.

2. The method of claim 1 further comprising performing voltage conversion of said one or more power signal inputs.

3. The method of claim 2 wherein said voltage conversion up-converts one or more voltages of said one or more power signals inputs to increase power stored within the external card adaptor.

4. The method of claim 2 wherein said voltage conversion circuitry up-converts or down-converts one or more voltages of said one or more power signal inputs in order to deliver appropriate voltage levels to said external card.

5. The method of claim 1 wherein said conditioning said one or more power signal inputs uses a power conditioning circuitry, said power conditioning circuitry comprising one or more capacitors characterized by a size suitable for use as a charge reservoir.

6. The method of claim 1 wherein said conditioning said one or more power signal inputs uses a power conditioning circuitry, said power conditioning circuitry comprising one or more bypass capacitors.

7. The method of claim 1 wherein said external card comprises a CF card or CF+ card.

8. The method of claim 1 wherein conditioning said one or more power signal inputs comprises filtering said one or more power signal inputs using one or more passive electrical components to eliminate noise.

9. A method of supplying conditioned power to an external card comprising:
receiving one or more power signal inputs from a host computing device by an adaptor;
converting one or more voltages of said one or more power signal inputs in order to increase power stored in said adaptor; and
conditioning said one or more power signal inputs, said external card connected to said host computing device by way of said adaptor, said converting and said conditioning performed by said adaptor.

10. The method of claim 9 wherein conditioning said one or more power signal inputs comprises filtering said one or more power signal inputs using one or more passive electrical components to eliminate noise.

11. A system for providing conditioned power supply signals from a host computing device to an external card comprising:
an external card adaptor, said external card adaptor comprising:
a first connector for connecting said external card adaptor to said external card; and
a second connector for connecting said external card adaptor to said host computing device, said external card adaptor providing said conditioned power supply signals by processing one or more power supply signals provided by said host computing device.

12. The external card adaptor of claim 11 further comprising a printed circuit board, said printed circuit board comprising a mapping circuitry that appropriately maps corresponding signals between said external card and said host computing device.

13. The external card adaptor of claim 11 further comprising a power conditioning circuitry used to condition one or more power supply signals provided by said host computing device.

14. The external card adaptor of claim 11 further comprising a voltage conversion circuitry used to generate increased charge within said external card adaptor.

15. The external card adaptor of claim 13 wherein said power conditioning circuitry comprises one or more large capacitors that act as charge reservoirs.

16. The external card adaptor of claim 13 wherein said power conditioning circuitry comprises one or more passive components used to filter out noise from said one or more power supply signals provided by said host computing device.

17. The external card adaptor of claim 13 further comprising a voltage conversion circuitry used to generate increased charge within said external card adaptor.

18. The external card adaptor of claim 12 wherein said printed circuit board comprises a voltage level sensor tat monitors power supply voltages delivered to said external card.

19. The external card adaptor of claim 18 wherein said voltage level sensor is capable of sensing an inadequacy of power delivered to said external card so as to effectuate a certain voltage level in a control signal that may be used to enable said power conditioning circuitry or said voltage conversion circuitry.

20. The external card adaptor of claim 13 wherein the power conditioning circuitry performs filtering of said one or more power signal inputs using one or more passive electrical components to eliminate noise.

21. A method of providing conditioned power from an external card adaptor to an external card comprising:
first connecting said external card adaptor to a connector of a host computing device;
receiving said external card into a recess of said external card adaptor;
second connecting said external card to a connector of said external card adaptor;
receiving one or more power signal inputs from said host computing device;
conditioning said one or more power signal inputs to generate said conditioned power; and
transmitting said conditioned power to said external card.

22. A system for providing conditioned power and voltage conversion to an external card from a host computing device, said system comprising:
an external card adaptor, said external card adaptor comprising:
a power conditioning circuitry used to provide said power conditioning; and
a voltage conversion circuitry used to provide said voltage conversion, said external card adaptor used to communicatively couple said external card to said host computing device.

* * * * *